United States Patent [19]

McKinney

[11] Patent Number: 4,965,953
[45] Date of Patent: Oct. 30, 1990

[54] REMOTE CONTROLLED TURKEY DECOY

[76] Inventor: Richard H. McKinney, R.R. 1, Box 385, Denver, Iowa 50622

[21] Appl. No.: 377,107

[22] Filed: Jul. 10, 1989

[51] Int. Cl.⁵ ............................................ A01M 31/06
[52] U.S. Cl. .............................................................. 43/2
[58] Field of Search ........................................ 43/2, 3

[56] References Cited

U.S. PATENT DOCUMENTS

| | | | |
|---|---|---|---|
| 740,293 | 9/1903 | Loeble | 43/3 |
| 1,831,286 | 11/1931 | Chelini | 43/3 |
| 2,663,108 | 12/1953 | Dixon et al. | 43/3 |
| 2,691,233 | 10/1954 | Richardson | 43/3 |
| 3,059,368 | 10/1962 | Wortman | 43/3 |
| 3,350,808 | 11/1967 | Mitchell | 43/3 |
| 3,927,485 | 12/1975 | Thorsnes, Jr. | 43/3 |
| 4,128,958 | 12/1978 | Snow | 43/3 |
| 4,322,908 | 4/1982 | McCrory | 43/3 |

*Primary Examiner*—Richard K. Seidel
*Assistant Examiner*—James Miner
*Attorney, Agent, or Firm*—Zarley, McKee, Thomte, Voorhees & Sease

[57] ABSTRACT

A wild turkey decoy includes a support stand to which the main body member is pivoted. The head and neck member are in turn pivotally connected to the main body member. A spring interconnects the head and neck member to the support stand. A control line extends through guides on the support stand to the head and neck member whereby pull on the control line causes the entire bird to pivot downwardly first to the limit of its pivotal movement followed by the pivoting downwardly of the head and neck member to simulate a bird feeding. An alternate arrangement includes a tie-line extending between the head and neck member to the support stand whereby pull on the control line causes simultaneous pivotal movement of the main body member relative to the support stand and the head and neck member relative to the main body member.

16 Claims, 3 Drawing Sheets

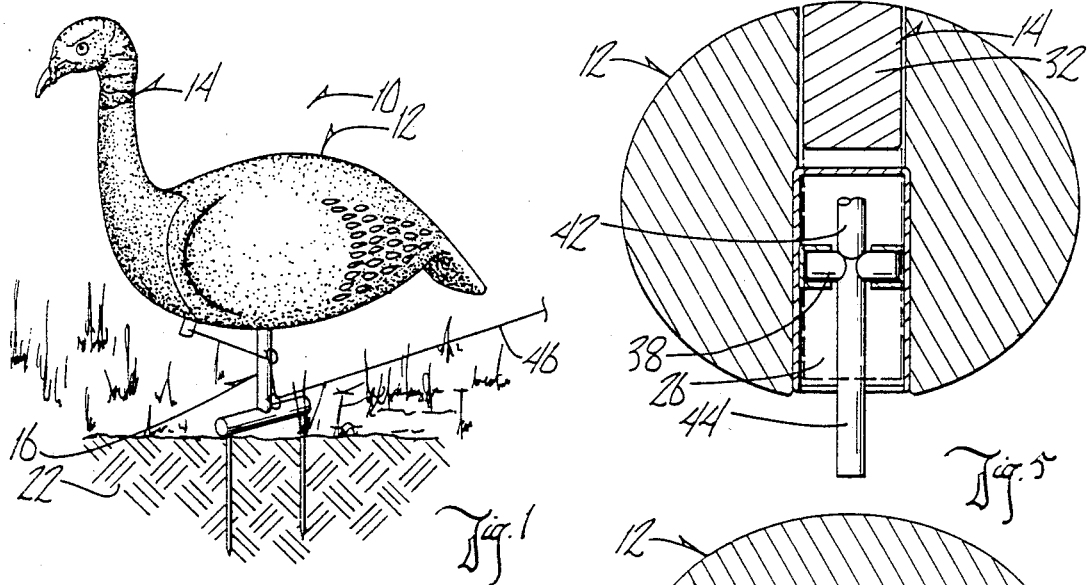
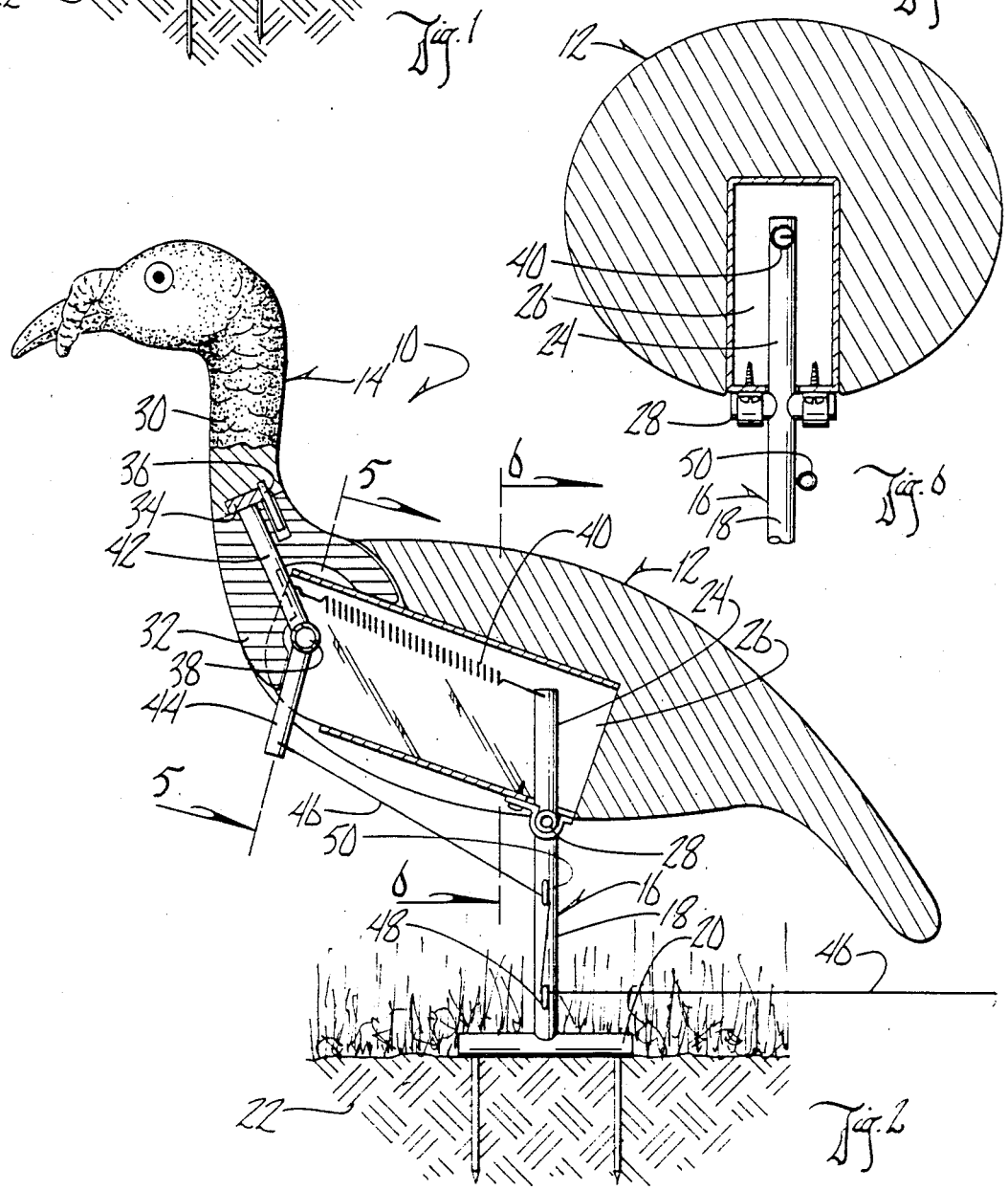

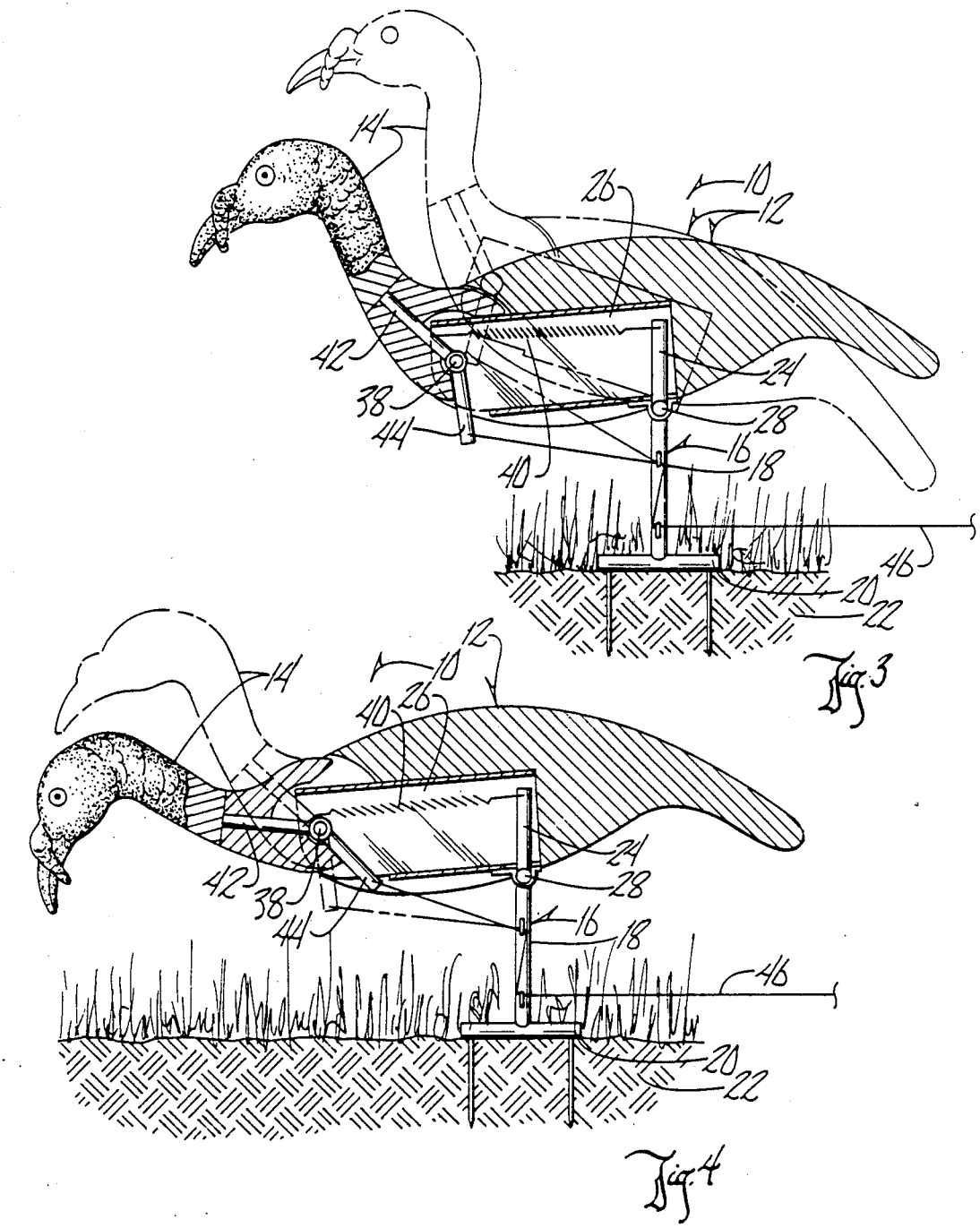

REMOTE CONTROLLED TURKEY DECOY

BACKGROUND OF THE INVENTION

A wild turkey decoy to be effective must be realistic in its appearance and operation. To be realistic the decoy must simulate the movements of a live wild turkey. These movements include, while eating the entire body pivoting towards the ground followed by the head and neck pivoting as when pecking the ground while eating.

Wild turkey decoys heretofore known are either non-animated stationary types or to the extent movement is possible, it is very limited and unrealistic and therefore ineffective in attracting live birds to the decoy.

What is needed is a realistic decoy that is simple and inexpensive to construct but is capable of multiple animations for simulating a live wild turkey.

SUMMARY OF THE INVENTION

A wild turkey decoy is provided on a stake-type support stand. The decoy includes a main body member pivoted on the stand and a head and neck member is pivoted to the main body member. A remote control line is connected to the head and neck member which in turn is connected to the support stand by a spring. Pull on the control line first pivots the body member relative to the support stand and when the body member engages a stop the head and neck member begin to pivot simulating an actual wild turkey eating when the head and neck member are pivoted in a repetitious manner.

An alternate arrangement is possible where the remote control line is connected to the main body member and a tie line is connected between the head and neck member and the support stand whereby pull on the control line causes both members to pivot simultaneously. This is not as realistic but on occasions may be desired.

DESCRIPTION OF THE DRAWINGS

FIG. 1 is a perspective view of the wild turkey decoy in use.

FIG. 2 is an enlarged fragmentary longitudinal cross-sectional view thereof.

FIG. 3 is a view similar to FIG. 2 showing the decoy having pivoted the full extent of its pivotal movement prior to the head and neck member beginning to pivot.

FIG. 4 is a view similar to FIG. 3 but showing the head and neck member pivoted after the body member has stopped pivoting.

FIG. 5 is a cross-sectional view taken along line 5—5 in FIG. 2.

FIG. 6 is a cross-sectional view taken along line 6—6 in FIG. 2.

DESCRIPTION OF THE PREFERRED EMBODIMENT

Figure 7:
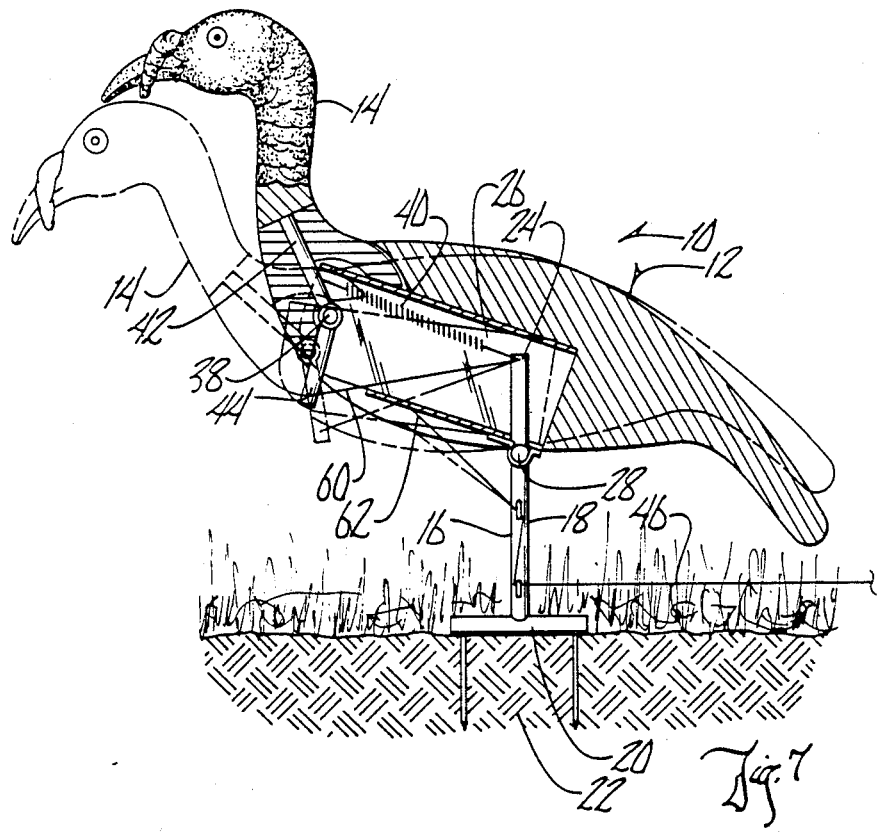
FIG. 7 is a view similar to FIG. 3 but showing an alternative embodiment wherein the body member and head and neck member pivot simultaneously in response to a pull on the control line.

The wild turkey decoy of this invention is referred to generally in FIG. 1 by the reference numeral 10.

The decoy 10 includes a main body member 12 to which a head and neck member 14 are pivoted. A support stand 16 is provided on which the main body member 12 is pivotally mounted.

The support stand 16 includes a bottom portion 18 having a stake 20 stuck into the ground 22. A top portion 24 extends into a chamber 26 of the main body 12. A hinge 28 connects the chamber 26 to the support stand 16 intermediate the top and bottom portions 24 and 18 respectively.

The head and neck member 14 include a head portion 30 removably connected to a neck portion 32 by a magnet 34 and a centering or locating pin 36. The head and neck member 14 include a hinge frame member 38 which connects the head and neck member to the main body member 12.

A spring 40 extends between the top portion 24 of the support stand 16 and a top hinge portion 42 of the hinge frame 38 which also has a bottom frame portion 44 which extends below the main body member 12.

A control line 46 extends through a pair of vertically spaced apart eyes 48 and 50 on the lower portion 18 of the support stand 16 and thence to the lower frame portion 44 of the hinge frame 38.

It is thus seen in operation in FIGS. 3 and 4 that a pull on the control line 46 causes the decoy to pivot in its entirety from the dash-line position in FIG. 3 to the solid line position whereupon the upper portion 24 of the support stand 16 engages the rear wall of the chamber 26 thereby preventing any further pivotal movement of the main body member 12. At this point further pivotal movement is possible by pulling on the control line 46 as the head and neck member 14 can continue to pivot downwardly as seen in the solid line position in FIG. 4. Repetitive pulls on the control line 46 when the decoy is in the position shown in FIG. 4 will simulate a pecking action similar to an actual wild turkey feeding on the ground. Occasionally it would be appropriate to return the decoy to the dash line position of FIG. 3 which would be normal for a bird eating.

Figure 8:
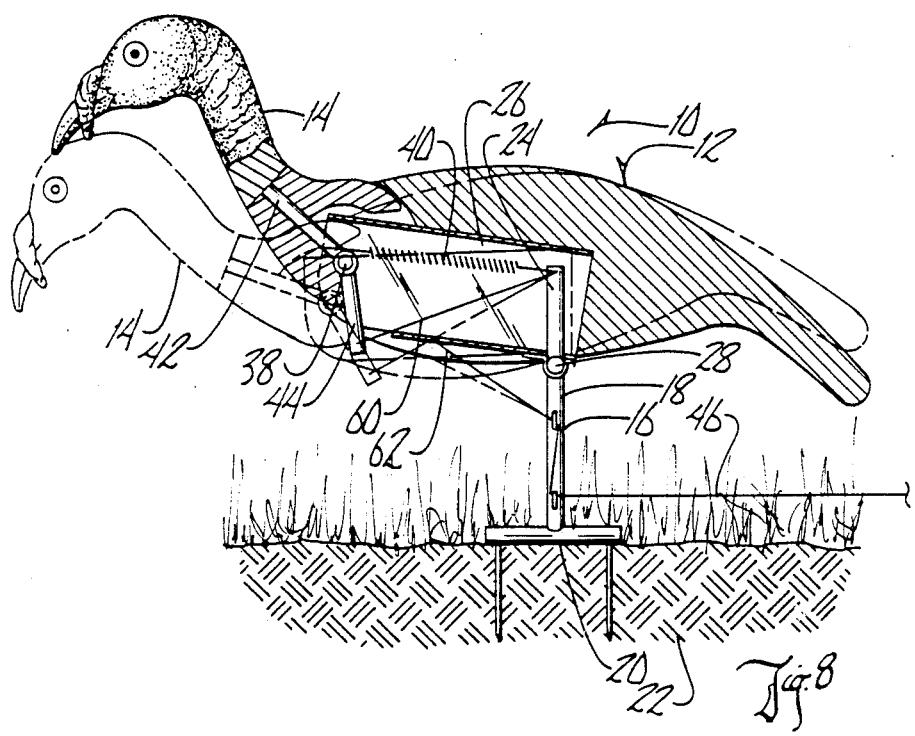
FIG. 8 is a view similar to FIG. 7 but showing the body member and head and neck member having pivoted further downwardly.

Alternate animation of a wild turkey decoy is possible as shown in FIGS. 7 and 8. The animation in these figures involves the main body member 12 and the head and neck member 14 pivoting simultaneously in response to a pull on the control line 46. This is made possible by a tie-line 60 extending between the lower hinge frame portion 44 and the top of the top support stand portion 24. The only other difference is that the control line is connected to the main body member 12 at 62 rather than on the lower hinge frame portion 44 as was the case for the decoy in FIGS. 1-6.

Thus in operation the first pull on the control line 46 moves the decoy from the solid line position of FIG. 7 to the dash line position where it is seen that the main body member 12 has pivoted relative to the support stand 16 and the head and neck portion 14 have pivoted downwardly relative to the main body member 12. In FIG. 8 it is seen that the main body member 12 has pivoted further to the dash line position which is the limit of its pivotal movement and the head and neck member 14 have pivoted further downwardly. The tie-line 60 assures this continuity of movement between both decoy members 12 and 14.

As noted the more realistic animated movement is shown in FIGS. 1-6 wherein the entire bird pivots first followed by the head and neck 14 pivoting last to simulate the bird eating but if desired the body member 12 and head and neck member 14 may be pivoted simultaneously as indicated in FIGS. 7 and 8.

I claim:

1. A remote controlled fowl decoy comprising,
   a fowl decoy on a support stand,
   said decoy having a body member pivotally connected to said support stand, and a head and neck member pivotally connected to said body member,
   a spring means operatively connected between said support stand and said body member and head and neck member,
   a remote controlled control line operatively connected to said body member and said head and neck member whereby a pull on said line causes said body member to pivot relative to said support stand and said head and neck member to pivot relative to said body member, and
   said body member having a chamber and said support stand extending into said chamber; said body member being pivoted to said support stand intermediate its ends at a point below its top end and said spring means being connected to the top end of said support stand above the pivot point and in said chamber.

2. The structure of claim 1 wherein said pivotal connection between said head and neck member to said body member includes said pivot being intermediate top and bottom portions of said head and neck member, and said spring means being connected to said top portion above said head and neck member pivot point.

3. The structure of claim 2 wherein said pull on said control line causes said body member to pivot first followed by said head and neck member pivoting second.

4. The structure of claim 3 wherein said control line is connected to said bottom portion of said head and neck member below the pivot point of the connection between said head and neck member to said body member.

5. The structure of claim 4 wherein a stop is provided to limit pivotal movement of said body member relative to said support stand and when said body member engages said stop continued pull on said control line causes said head and neck member to pivot.

6. The structure of claim 2 wherein said control line extends through a guide on said support stand below the pivot between said body member and support stand.

7. The structure of claim 6 wherein said control line further extends through a second guide on said support stand below said first guide.

8. The structure of claim 2 wherein said fowl decoy is further defined as being a wild turkey.

9. The structure of claim 2 wherein said support stand is further defined as including a stake for removable stationary positioning said decoy on the ground.

10. The structure of claim 2 wherein said head and neck member include head and neck portions separably interconnected by magnet means.

11. The structure of claim 10 wherein a centering pin is provided between said head portion and said neck portion.

12. A remote controlled fowl decoy comprising,
    a fowl decoy on a support stand,
    said decoy having a body member pivotally connected to said support stand, and a head and neck member pivotally connected to said body member,
    a spring means operatively connected between said support stand and said head and neck member, and
    a remote controlled control line operatively connected to said body member and said head and neck member, and said spring means being sufficiently strong that a pull on said line causes said body member to pivot relative to said support stand first followed by said head and neck member pivoting relative to said body member as continued pull is applied to said line.

13. The structure of claim 12 wherein said body member has a chamber and said support stand extends into said chamber; said body member being pivoted to said support stand intermediate its ends at a point below its top end and said spring means being connected to the top end of said support stand above the pivot point and in said chamber.

14. A remote controlled fowl decoy comprising,
    a fowl decoy on a support stand,
    said decoy having a body member pivotally connected to said support stand, and a head and neck member pivotally connected to said body member,
    a spring means operatively connected between said support stand and said body member and head and neck member,
    a remote controlled control line operatively connected to said body member and said head and neck member whereby a pull on said line causes said body member to pivot relative to said support stand and said head and neck member to pivot relative to said body member, and
    a tie means being connected between said head and neck member, and said stand whereby said pull on said control line causes said body member and said head and neck member to pivot simultaneously with said head and neck member pivoting relative to said body member as said body member pivots relative to said stand.

15. The structure of claim 14 wherein said control line is connected to said body member between said head and neck member and said pivotal connection to said support stand.

16. The structure of claim 15 wherein said tie means interconnect said support stand above its pivotal connection to said body member and said head and neck member below its pivotal connection to said body member whereby pivoting of said head and neck member relative to said body member occurs simultaneously with pivoting of said body member relative to said support stand.

* * * * *